United States Patent
Phillips et al.

(10) Patent No.: US 7,133,848 B2
(45) Date of Patent: Nov. 7, 2006

(54) DYNAMIC PRICING SYSTEM

(75) Inventors: Robert L. Phillips, Palo Alto, CA (US); Michael S. Gordon, San Mateo, CA (US); Ozgur Ozluk, San Francisco, CA (US); Stefano Alberti, Mountain View, CA (US); Robert A. Flint, Redwood City, CA (US); Jorgen K. Andersson, Sunnyvale, CA (US); Keshava P. Rangarajan, Twickenham MiddleSex (IN); Tom Grossman, Rockville, MD (US); Raymond Mark Cooke, Half Moon Bay, CA (US); Jeremy S. Cohen, Sunnyvale, CA (US)

(73) Assignee: Manugistics Inc., Rockville, MD (US)

( * ) Notice: Subject to any disclaimer, the term of this patent is extended or adjusted under 35 U.S.C. 154(b) by 1024 days.

(21) Appl. No.: 09/859,674

(22) Filed: May 18, 2001

(65) Prior Publication Data

US 2002/0116348 A1    Aug. 22, 2002

Related U.S. Application Data

(60) Provisional application No. 60/205,714, filed on May 19, 2000.

(51) Int. Cl.
*G06F 17/60* (2006.01)
(52) U.S. Cl. .......................... 705/400; 705/10
(58) Field of Classification Search ............ 705/1, 705/16, 26, 20, 27, 10, 400
See application file for complete search history.

(56) References Cited

U.S. PATENT DOCUMENTS 5,377,095 A * 12/1994 Maeda et al. ............... 705/10
5,960,407 A *  9/1999 Vivona ....................... 705/10
6,094,641 A *  7/2000 Ouimet et al. .............. 705/10
6,415,263 B1 *  7/2002 Doss .......................... 705/26
6,910,017 B1 *  6/2005 Woo et al. .................. 705/10
6,963,854 B1 * 11/2005 Boyd et al. ................. 705/37

FOREIGN PATENT DOCUMENTS

JP        2001331691 A  * 11/2001

OTHER PUBLICATIONS

Subrahamanyan et al. ,"Developing optimal pricing and inventory policies for retailers who face uncertain demand", Spring 1996, Journal of Retailing, v72, n1, p7(24).*
Kiser, Elizabeth Kristen, Ph.D., "Demand and pricing in the breakfast cereals industry", Nov. 1998, University Od wisconsin-Madison, Dissertation, p. 1676.*
Tam et al. "Price elasticity and the growth of computer spending", May 1999, IEEE Transaction of Engineering management. vol. 46, Iss. 2, p. 190, 1 pg (abstract).*
Sanjog et al., "A cointegration analysis of demand: Implications for pricing", 1997, "Pricing Strategy & Practice", v5n4, pp. 156-163.*

* cited by examiner

*Primary Examiner*—Thomas A. Dixon
*Assistant Examiner*—Freda A. Nelson
(74) *Attorney, Agent, or Firm*—Hogan & Hartson LLP

(57) ABSTRACT

The present invention provides a dynamic pricing system that generates pricing recommendations for each product in each market. In particular, the system normalizes historic pricing and sales data, and then analyzes this historic data using parameters describing the user's business objectives to produce a pricing list to achieve these objectives. The system uses historical market data to forecast expected sales according to a market segment, product type, and a range of future dates and to determine the effects of price changes on the forecasted future sales. The system further calculates unit costs for the product. The system then estimates profits from sales at different prices by using the sales forecasts, adjusting these sales forecasts for changes in prices, and the costs determinations. The system optionally optimizes prices given current and projected inventory constraints and generates alerts notices according to pre-set conditions.

34 Claims, 7 Drawing Sheets

Historical Line Items

| LineItemID | ProdID | ChannelSegID | Date | Qty | QtyAdjPrice | State | UnitCost | Revenue | Cost | Qty |
|---|---|---|---|---|---|---|---|---|---|---|
| 1 | 1 | 3 | 01-Jun-99 | 109 | $119.05 | Sold | $ 114.81 | $ 12,976.21 | $ 12,514.29 | 92 |
| 2 | 1 | 3 | 01-Jun-99 | 34 | $119.46 | Sold | $ 114.81 | $ 4,061.71 | $ 3,903.54 | 31 |
| 3 | 1 | 3 | 01-Jun-99 | 165 | $124.24 | Sold | $ 114.81 | $ 20,499.29 | $ 18,943.65 | 1083 |
| 4 | 1 | 3 | 02-Jun-99 | 125 | $119.90 | Sold | $ 114.81 | $ 14,987.23 | $ 14,351.25 | 122 |
| 5 | 1 | 3 | 03-Jun-99 | 48 | $122.45 | Sold | $ 114.81 | $ 5,877.83 | $ 5,510.88 | 94 |
| 6 | 1 | 3 | 03-Jun-99 | 101 | $120.75 | Sold | $ 114.81 | $ 12,196.11 | $ 11,595.81 | 119 |
| 7 | 1 | 3 | 03-Jun-99 | 148 | $123.88 | Sold | $ 114.81 | $ 18,333.56 | $ 16,991.88 | 658 |
| 8 | 1 | 3 | 04-Jun-99 | 5 | $118.01 | Sold | $ 114.81 | $ 590.05 | $ 574.05 | 4 |
| 9 | 1 | 3 | 04-Jun-99 | 6 | $123.58 | Sold | $ 114.81 | $ 741.49 | $ 688.86 | 21 |
| 10 | 1 | 3 | 04-Jun-99 | 42 | $120.58 | Sold | $ 114.81 | $ 5,064.28 | $ 4,822.02 | 47 |
| 11 | 1 | 3 | 04-Jun-99 | 17 | $122.18 | Sold | $ 114.81 | $ 2,077.13 | $ 1,951.77 | 30 |
| 12 | 1 | 3 | 04-Jun-99 | 92 | $121.76 | Sold | $ 114.81 | $ 11,202.01 | $ 10,562.52 | 142 |
| 13 | 1 | 2 | 04-Jun-99 | 20 | $118.96 | Sold | $ 126.29 | $ 2,379.17 | $ 2,525.82 | 19 |
| 14 | 1 | 2 | 04-Jun-99 | 8 | $117.96 | Sold | $ 126.29 | $ 943.65 | $ 1,010.33 | 7 |
| 15 | 1 | 2 | 04-Jun-99 | 112 | $118.02 | Sold | $ 126.29 | $ 13,217.84 | $ 14,144.59 | 97 |
| 16 | 1 | 2 | 04-Jun-99 | 125 | $120.49 | Sold | $ 126.29 | $ 15,061.11 | $ 15,786.38 | 130 |
| 17 | 1 | 3 | 04-Jun-99 | 134 | $118.33 | Sold | $ 114.81 | $ 15,856.46 | $ 15,384.54 | 100 |
| 18 | 1 | 3 | 04-Jun-99 | 125 | $119.36 | Sold | $ 114.81 | $ 14,919.39 | $ 14,351.25 | 111 |
| 19 | 1 | 1 | 05-Jun-99 | 162 | $117.74 | Sold | $ 122.55 | $ 19,074.63 | $ 19,853.18 | 139 |
| 20 | 1 | 1 | 05-Jun-99 | 141 | $122.58 | Sold | $ 122.55 | $ 17,283.98 | $ 17,279.62 | 175 |
| 21 | 1 | 3 | 05-Jun-99 | 46 | $119.34 | Sold | $ 114.81 | $ 5,489.61 | $ 5,281.26 | 41 |
| 22 | 1 | 3 | 05-Jun-99 | 131 | $119.10 | Sold | $ 114.81 | $ 15,601.90 | $ 15,040.11 | 111 |

FIG. 3

OPTIMIZATION

| ProductID (i) | Channel Segment (j) | Forecasted Total Demand | Channel Segment Adjusted Cost (c_ij) | Average Quantity Discount (a_ij) |
|---|---|---|---|---|
| 1 | 1 | 5229 | $ 122.55 | 2.40% |
| 1 | 2 | 4680 | $ 125.29 | 1.80% |
| 1 | 3 | 9741 | $ 114.81 | 0.90% |

MAXIMIZE  TOTAL MARGIN - $

SUBJECT TO  TOTAL SALES <= TOTAL SUPPLY
PRICE >= COST  *for each product/channel segment combination*
strategic objectives  PRICE >= MIN_PRICE  *for each product/channel segment combination*
PRICE <= MAX_PRICE  *for each product/channel segment combination*
SALES >= MIN_SALES  *for each product/channel segment combination*
SALES <= MAX_SALES  *for each product/channel segment combination*

| | | | | |
|---|---|---|---|---|
| x11: | price of Product 1/Channel 1 | $ 129.45 | | |
| x12: | price of Product 1/Channel 2 | $ 131.00 | | |
| x13: | price of Product 1/Channel 3 | $ 120.43 | | |
| t11: | quantity sold Product 1/Channel 1 | 1524 | 0.29 | normalization factor for Product1/Channel1 |
| t12: | quantity sold Product 1/Channel 2 | 819 | 0.18 | normalization factor for Product1/Channel2 |
| t13: | quantity sold Product 1/Channel 3 | 8910 | 0.91 | normalization factor for Product1/Channel3 |

FIG. 5

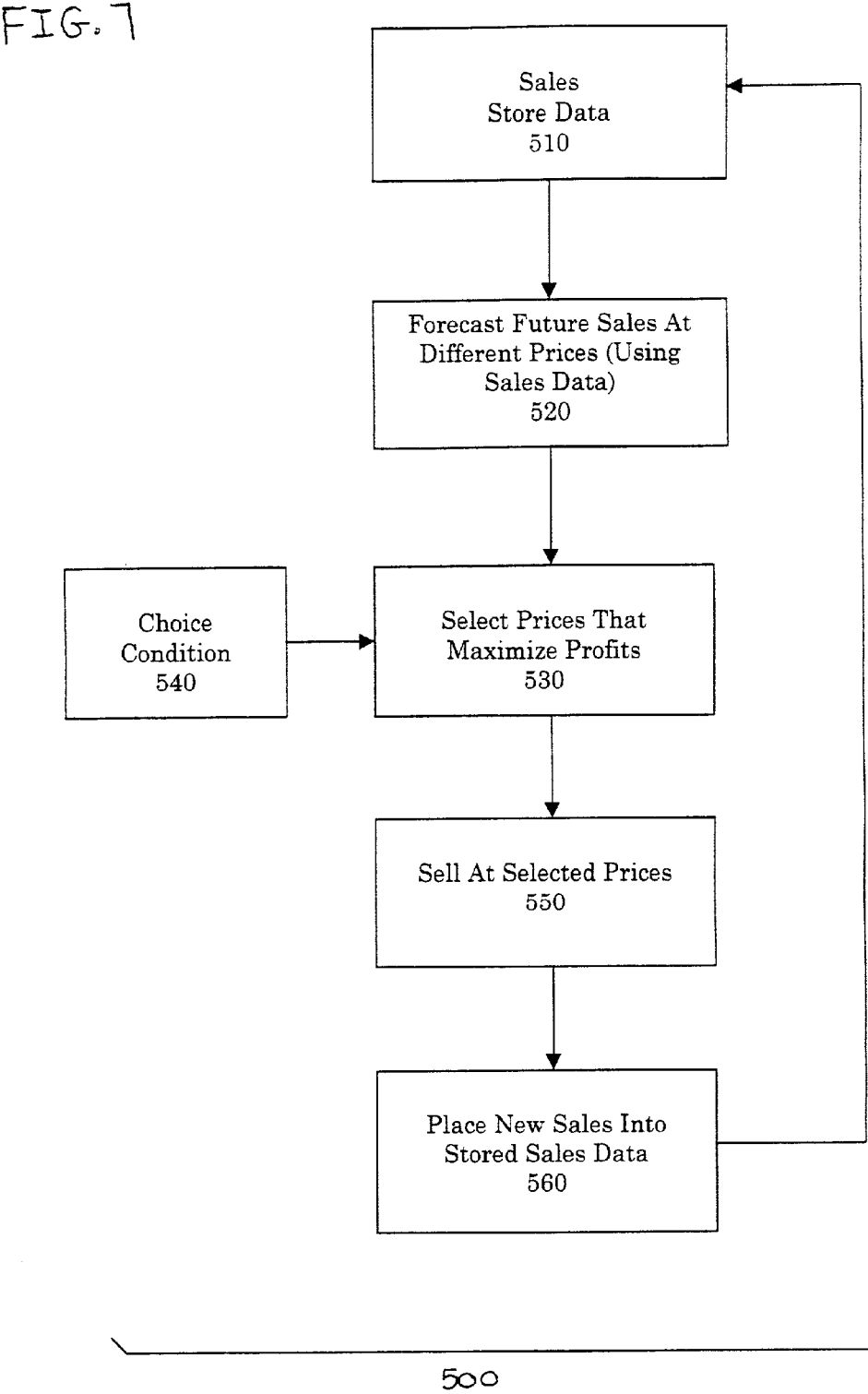

DYNAMIC PRICING SYSTEM

RELATED APPLICATIONS

This application claims priority from U.S. Provisional Application No. 60/205,714, filed on May 19, 2000, the disclosure of which is hereby incorporated by reference in full.

FIELD OF THE INVENTION

The present invention is a dynamic pricing system for producing an optimized price recommendation to maximize expected profits based upon forecasted sales and price sensitivity derived from prior transaction statistics.

BACKGROUND OF THE INVENTION

Historically, there has been no way for a supplier to predict, with high certainty, the price at which a product must be sold in order to maximize profits. Under traditional sales models, pricing decisions are made based on estimates, such as anticipated product demand and presumed price sensitivity, in the hope of maximizing profits. The procedure for forming these estimates is time and labor intensive. For example, it is known in existing spreadsheet programs to recalculate derived values automatically from data changes entered into the spreadsheet. Display of such recalculated values facilitates evaluation of hypothetical "what if" scenarios for making business decisions. However, this is done by changing a value in a cell of the spreadsheet, resulting in recalculating all variable entries dependent on the variable changed. It is not easy for the user to see the global effect of such changes without a careful review of the recalculated spreadsheet or separate screens showing graphs derived from the recalculated spreadsheet. The result is a cumbersome iterative process in which the user must change a value in a cell of the spreadsheet, obtain a graph of the resulting dependent variable changes, determine whether those results are as desired, if not, go back to the spreadsheet and make another value change in a cell, redraw the graph, and so forth until desired results are achieved. The process is even more cumbersome if the user desires to add a line to a graph, which requires the generation of new cells in the spreadsheet. An improved system would automatically perform these functions with little input from users.

There are several difficulties in forming an automated dynamic pricing system. One problem is that most sellers keep incomplete pricing data. For example, while the ideal client for the system would maintain data on lost customers, competitor prices, industry availability and the like, most sellers will have data on only a subset of the potential drivers of market response. Furthermore, the known dynamic pricing system can neither adjust rapidly to account for changes in market conditions nor suggest different prices for different markets.

SUMMARY OF THE INVENTION

In response to these and other needs, the present invention provides a dynamic pricing system that generates pricing recommendations for one or more products. The system divides records of prior sales to define market segments, such that each sale only falls into a single segment. The system then uses pricing and sales data from these sales to determine optimal prices in view of parameters describing the user's business objectives to produce a pricing list to achieve these objectives. In particular, the system uses historical market data to forecast expected sales within each channel segment, product type, and a range of future dates. Historical market data is further used to predict the effects of price changes on the forecasted future sales. The system then estimates profits from sales at different prices by using the sales forecasts, adjusting these sales forecasts for the different prices, and then subtracting costs for the product which is an input to the system. The system optionally optimizes prices given current and projected inventory constraints and different strategic objectives, also known as business rules. The system therefore provides the user with prices that maximize profits within the desired sales volume levels.

In one embodiment, after making price recommendations using the forecasted sales numbers, the system monitors actual sales and pricing information. The system then compares the forecasted sales statistics with the actual sales statistics and notifies the users of any differences, such as actual sales volumes or prices that differ greatly from the forecasted values.

In another embodiment, the dynamic pricing system is general enough to provide price recommendations with varying degrees of available data. In particular, the system produces a viable pricing value estimate using available data, and then modifies that price estimate with increased forecasting accuracy by incorporating the new data, as it becomes available. In this way, the system functions constantly and in real time to update and alter price recommendations to reflect the most recently acquired sales data.

BRIEF DESCRIPTION OF THE DRAWINGS

Referring now to the drawings in which like reference numbers represent corresponding parts throughout:

FIGS. 3–5 are output images from the system of FIG. 2 in accordance with a preferred embodiment of the present invention; and FIG. 7 is a flowchart diagram for dynamic pricing method in accordance with a preferred embodiment of the present invention.

DETAILED DESCRIPTION OF A PREFERRED EMBODIMENT OF THE INVENTION

Figure 1:
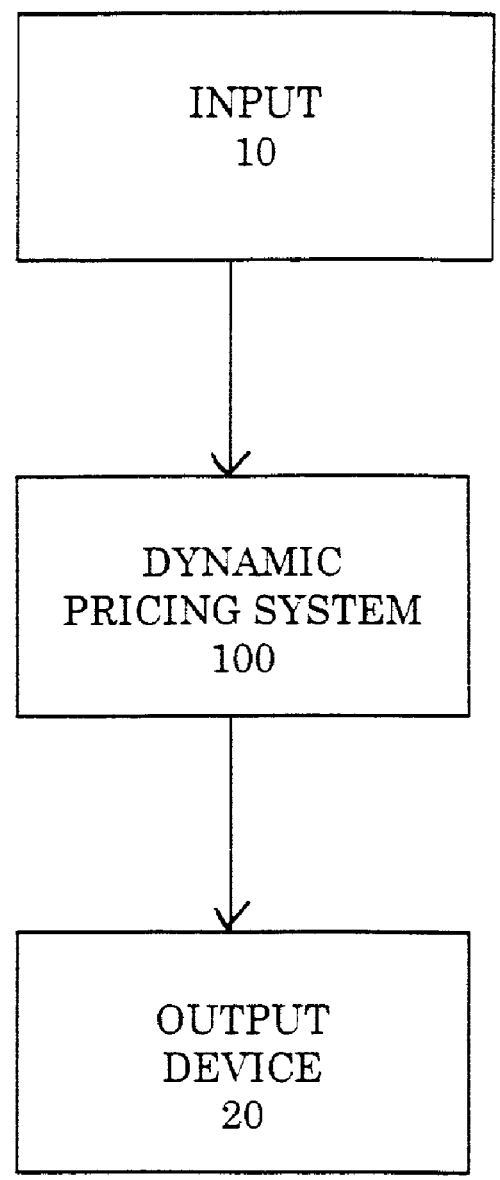
FIGS. 1 and 6 are schematic diagrams of system incorporating the dynamic pricing system of FIG. 2 in accordance with a preferred embodiment of the present invention.

As depicted in FIG. 1, the present invention provides a dynamic pricing system 100 for automatically producing a set of price recommendations. The dynamic pricing system 100 is electronically connected to an input device 10 and one or more output devices 20. The input device 10, such as a keyboard or mouse, allows a user to provide data into dynamic pricing system 100 by transferring information into an electronic format as needed by the dynamic pricing system 100. Analogously, the output devices 20, such as a monitor or a printer, presents price recommendations and other information from the dynamic pricing system 100 to the user in a non-electronic format. The input and output devices 10 and 20 allow an electronic dialogue between the user and the dynamic pricing system 100.

Figure 2:
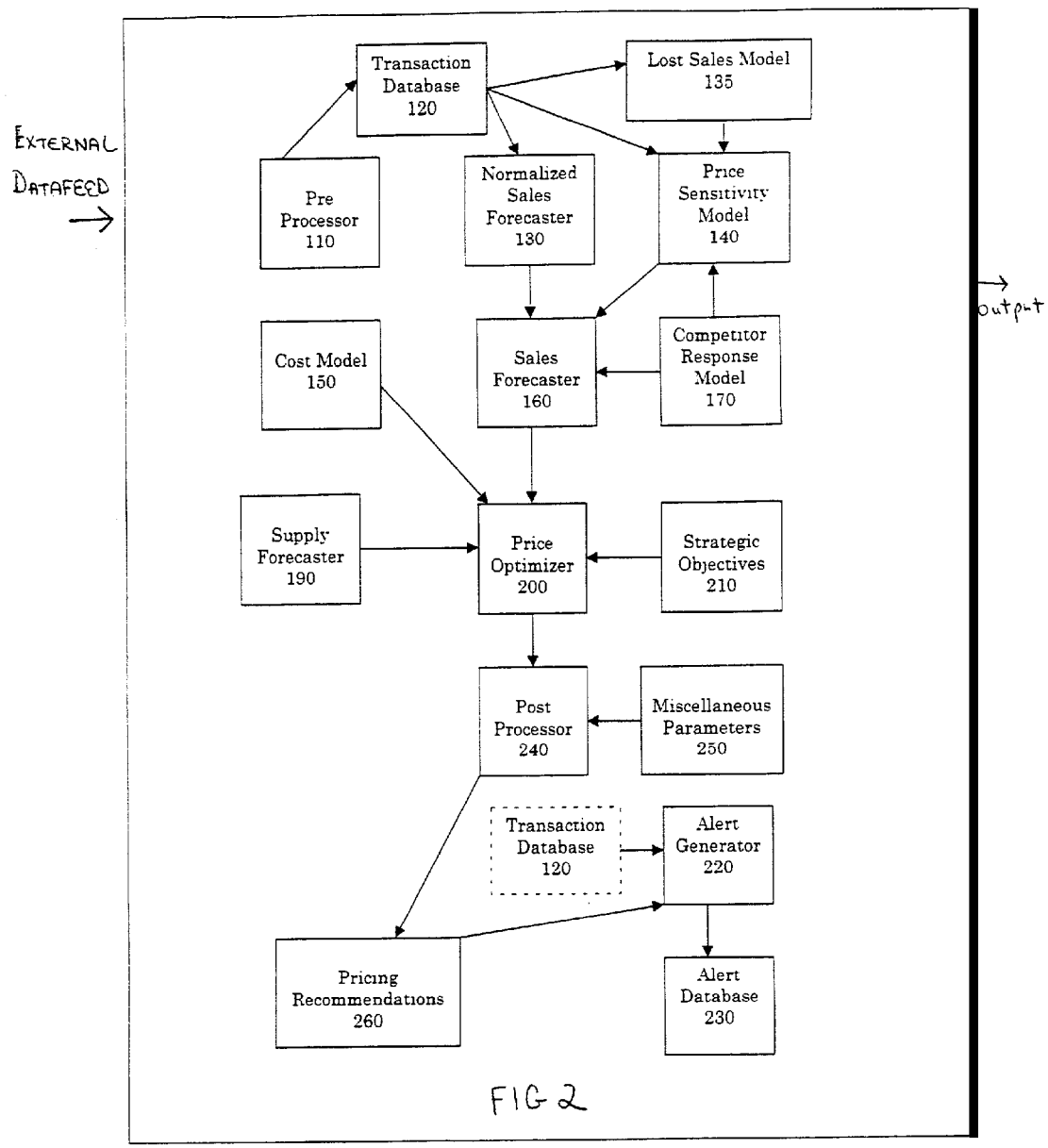
FIG. 2 is a schematic diagram of a dynamic pricing system in accordance with a preferred embodiment of the present invention.

As depicted in FIG. 2, the dynamic pricing system 100 generally includes a Transaction Database 120, a Normalized Sales Forecaster 130, a Price Sensitivity Model 140, a Cost Model 150, a Sales Forecaster 160, and a price optimizer 200. The components combine to allow the dynamic pricing system 100 to use historical data from prior transactions to form profit maximizing price recommendations for future sales. The dynamic pricing system 100 specifically uses the historical data to estimate price elasticity for a product in a particular channel segment. The dynamic pricing system 100 further uses the historical data to predict future product sales at current prices. The dynamic pricing system 100 then combines the sales predictions with the price elasticity results to form a prediction of sales levels in the market segment in the future at different prices for the product. The dynamic pricing system 100 then determines costs for the product and combines the costs result with the predicted sales at the different price levels to determine a set of optimal, profit maximizing prices for a product in different markets. The function of these individual components is now described in greater detail.

Transaction Data

The system 100 stores a record of prior transactions in a transaction database 120. The user may input this information using the input device 10 or, as described below, transaction data may be automatically fed into the transaction database 120 from outside sources, for example, by monitoring shipments to customers. It should be appreciated, however, that the particular manner and method of processing and storing transaction data may be selected as necessary to fulfill the user's needs. In particular, the present invention relates to the analysis of transaction data and does not generally concern the collection of this data. In fact, the dynamic pricing system 100 adjusts to create accurate price recommendations where the data collection is flawed or incomplete, as describe in greater detail below.

Typically, a pre-processor 110 analyzes transaction data so that the transaction database 120 is it is organized in a usable, functional manner. In this way, the transaction database may have any usable storage format, as needed for quick and consistent data access. In one embodiment, the transaction database 120 is a multi-dimensional database for On Line Analytical Processing (OLAP). Multi-dimensional databases facilitate flexible, high performance access and analysis of large volumes of complex and interrelated data, even when that data spans several applications in different parts of an organization. Aside from its inherent ability to integrate and analyze large volumes of enterprise data, the multi-dimensional database offers a good conceptual fit with the way end-users visualize business data. For example, a monthly revenue and expense statement with its row and column format is an example of a simple two-dimensional data structure. A three-dimensional data structure might be a stack of these worksheets, one for each month of the year. With the added third dimension, end-users can more easily examine items across time for trends. Insights into business operations can be gleaned and powerful analysis tools such as forecasting and statistics can be applied to examine relationships and project future opportunities.

The transaction data in the transaction database 120 generally includes information that specifies the details of each transaction, such as the date of the transaction, the transacted product, the price for the transacted products, the parties involved in the transaction, etc. Each transaction has several attributes specifying its different features, and by exploiting the similarities within the attributes, the transactions can be grouped by market segments. Furthermore, different market segments may be grouped into mutually exclusive and collectively exhaustive sets called channel segments (CS). Within this disclosure, channel segments are defined to be aggregations of transactions along market segment dimensions. For example, geographic area, size of sales, method of delivery, buyers' characteristics, etc. may be used to define channel segments. The channel segments are specified by the user through the input device 10, and the channel segments must combine to form a mutually exclusive, exhaustive set on the universe of all sales transactions (the "market"). In other words, each and every sale can be classified into only one channel segment. These channel segments are the level at which product prices will be recommended and are the level at which the dynamic pricing system 100 computes forecasts. Broadly defining the channel segments improves numerical analysis by increasing the number of samples for analysis. However, broadly defining the channel segments limits possible gains to the user/seller increase profits from specifically pricing multiple smaller channel segments.

Ideally, the user may view the transaction database 120 to review the prior transactions, as illustrated in FIG. 3. Each transaction 121, in the illustrated transaction database 120 includes a product identifier 122, a channel segment identifier 123, a quantity of sale identifier 124, and a sales price identifier 125.

Price Sensitivity

A price sensitivity model (PSM) 140, FIG. 2, uses the information in the transaction database 120 to predict price sensitivity of buyers for the product(s) in issue. In other words, the PSM 140 mathematically estimates how changes in price for a product affect buyers' demand for that product. The price sensitivity calculations from the PSM 140 are important because the dynamic pricing system 100 uses these calculations to predict changes in sales of the product at different prices when producing a profit maximizing price for the product. For a specific channel segment, the PSM 140 generally models price sensitivity for a particular product through a function that varies with price P to represent the relative changes in sales volumes X. The parameters for the price sensitivity function, $F_{PS}(P)$, may be empirically determined through surveys, experiments, or analysis or, otherwise, may be supplied by the user through the input device 20. Alternatively, the dynamic pricing system 100 may dynamically determine the parameters for the $F_{PS}(P)$ from analyzing the transaction data in the transaction database 120 according to known accounting and statistical methods. In other words, the PSM 140 looks to see how price changes in the past have affected sales within the channel segment and uses these results to predict the effect of future price adjustments. The dynamic pricing system 100 determines separate price sensitivity functions $F_{PS}(P)$ for every product and channel segment.

In one implementation, the PSM 140 looks to changes in sales prices and models the changes in sales as a function of changes in prices ($\delta X/\delta P$). This method is premised on the assumption that price has an instantaneous impact on sales volume and that this impact is consistent over time. The PSM 140 therefore assumes that sales volume is strictly a function of the price level. In this implementation, the PSM assumes that at a starting or reference price $P_{REF}$, all the demand for the particular product turns into sales. If a transaction takes place at a final price $P_{final}$, different than $P_{REF}$, then the transaction quantity is assumed to be different than what it would have been at the reference price. The transaction quantity is then normalized using a normalization factor that is produced by the price sensitivity function, $F_{PS}(P)$. For example, if 100 units of product are sold at $P_{final}$=$30/unit, where $P_{REF}$=$35/unit and $F_{PS}(P_{final})$=0.9, then the normalized transaction quantity is 100/0.9=111, implying pricing the product at $30 in this channel segment would result in the sale of 111 units.

The PSM 140 may determine the $F_{PS}(P)$ from a logistic model, as that developed by Belgian mathematician Pierre Verhulst. The logistic model is frequently used in biological population studies and assumes upper and lower asymptotes on changes. Therefore, price sensitivity function can be estimated through the following equation:

$$F_{PS}(P)=0.2*\{1-[\text{ArcTan}(\alpha*(P_{final}-P_{REF}))*2/\pi]\} \quad \text{(Eq. 1)}$$

where the value of $\alpha$ is empirically determined according to the transaction records. For example, if the PSM 140 is selecting between two possible options for $\alpha$ (say $\alpha_1$ and $\alpha_2$), the PSM 140 then chooses the value for $\alpha$ that best corresponds to the sales and price numbers from prior transactions. Equation 1 has asymptotes at 0.0 and 2.0, so sales cannot be negative and price reductions can, at most, double sales volumes. Another result of using Equation 1 is that sales volumes do not change when prices do not change.

The PSM 140 can similarly generalize the price sensitivity function of Equation 1 through the following equation:

$$F_{PS}(P) = r * \frac{\exp(K_0 + K_1 * P)}{1 + \exp(K_0 + K_1 * P)} \quad \text{(Eq. 2)}$$

where $K_i \geq 0$ and $r \approx 0.2$. In Eq. 2, the variable r represents the maximum possible rate of change for price sensitivity function, and the $K_i$ represent market factors that limit the maximum rate of change r at time period i. As before, Equation 2 concludes that $F_{PS}(P_{REF})$=1, so that sales within the channel segments do not change if prices do not change. The r and K$i$ are determined using known statistical techniques by analyzing the transaction records and parameters related the product's price elasticity. Also, the model may further assume that $F_{PS}(O)$=2, so that offering free products doubles consumption of that product within the channel segment. Other functional forms for $F_{PS}$ are possible, corresponding to alternative expressions for equations 1 and 2.

Alternatively, the PSM 140 may use a linear model. In the linear model, $F_{PS}(P)$ is a line defined by a slope estimating the change in sales per change in price and an intersect on the price axis at which sales volume is zero.

Figure 4:
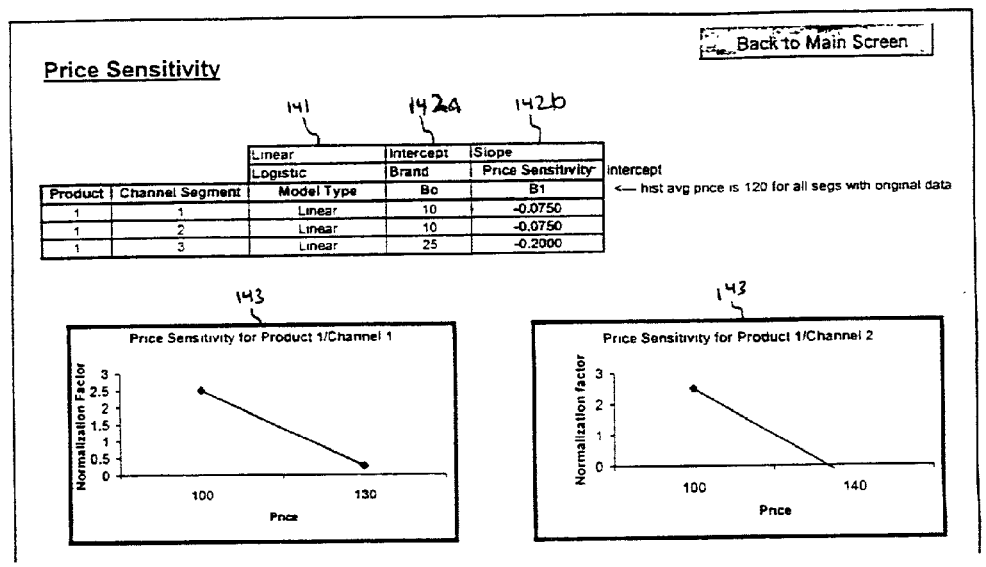

The system 100 may display the results produced by the PSM 140, as illustrated in FIG. 4. Specifically, FIG. 4 illustrates the display of a price sensitivity model type 141 used to analyze the product in each channel segment and price sensitivity model variables values 142a and 142b. The FIG. 4 further illustrates the display of graphs 143 of price sensitivity curves using the linear model between maximum and minimum prices, If the transaction database 120 includes lost sales data that represents the number of sales lost through changeable conditions such as insufficient inventory, then a lost sales model (LSM) 135, FIG. 2, could employ a win probability function, $F_{WP}$, analogous to the price sensitivity function $F_{PS}$ of the PSM 140. The win probability function takes a control variable as its independent variable (such as inventory levels) and produces an estimate of increased sales for the product in the particular channel segment as the control variable is varied. Typically, the control variable for the win probability function is either price or an adjusted margin for the channel segment.

Sales Forecaster

Using transaction information from the transaction database 120, a Normalized Sales Forecaster (NSF) 130, FIG. 2, predicts future sales within the particular channel segment assuming that the reference price is charged. In particular, the NSF 130 functions as a generic, univariate time-series forecaster to predict sales volume, assuming that a constant reference price is applied throughout the forecast horizon. The NSF 130 may further forecast the number of total offers made as well as normalized sales quantities.

The Sales Forecaster (SF) 160 then uses the sales forecast from the NSF 130 and price sensitivity conclusions from PSM 140 and to predict sales for the product within the channel segment at different prices. Specifically, the SF 160 predicts decreases in sales from increase in prices and increases in sales from decreases in product prices. The dynamic pricing system 100 then uses the sales forecasts from the SF 160 to determining profit-maximizing prices for various products within various channel segments.

The accuracy of the sales forecasts from the NSF 130 and the SF 160 allows the dynamic pricing system 100 to produce reasonable pricing recommendations. In forecasting future sales, the NSF 130 and the SF 160 use a defined forecast horizon that specifies how far in the future to forecast sales, and the accuracy of the sales forecast is improved by using shorter-term forecast horizons where possible since short-term forecasts are intrinsically more accurate. Because the date range over which forecasts are made may depend on the length of restocking intervals, these intervals should be chosen carefully. In the case of very long restocking cycles, the dynamic pricing system 100 can model the restocking intervals as a series of shorter forecast horizons.

The accuracy of the sales forecast may be further improved by a clear, sound definition of loss if lost sales data is available. The sales forecasts from the NSF 130 and the SF 160 may be further improved by using relatively few channel segments and by grouping the separate products into a manageable set of model categories. A smaller number of channel segments means more historical data for each channel segment and fewer channel segments to manage. Likewise, a smaller number of model categories results in more historical data for each model categories and fewer model categories to manage.

In one embodiment, the NSF 130 and the SF 160 use the information from the transaction database 120 to produce a total sales, $X_{SKU}$, for a particular product (SKU) in a channel segment (CS) over a range of time ($t_i$) by summing sales for that product in that channel segment over that range of time. Similarly, an aggregate sales total, $\Sigma X_{SKU}$, for multiple products ($SKU_{1-n}$) in the channel segment, is found by summing the sales total $X_{SKU}$ for each of the products. The system can then determine a product's fraction of total sale volume by dividing sales total for a particular product by the aggregate sales total for multiple products. The dynamic pricing system 100 then forecasts a group of products' daily sales volume by channel segment.

The dynamic pricing system 100 may perform forecasting through known statistical methods, such as linear regression or non-linear regression analysis using curve-fitting based on exponential, power, logarithmic, Gompertz, logistic, or parabola functions. In addition, numerous averaging, smoothing, and decomposition techniques to increase the accuracy of statistical forecasts are known and may be employed by the dynamic pricing system 100. As will be appreciated by one skilled in the art, the NSF 130 and the SF 160 may employ any commercially available forecasting program.

In a preferred embodiment, the NSF 130 and the SF 160 are adapted to forecast sales cycles in which the number of prior sales varies predictably over a period of time. To forecast these sales cycles accurately, the NSF 130 and the SF 160 may forecast each day-of-week separately; i.e., forecast the Monday time series separately from Tuesday, Wednesday, etc. The NSF 130 and the SF 160 can then perform an analysis of variance (ANOVA) or t-test to detect which days of the week are statistically "different" in their mean level. Alternatively, the NSF 130 and the SF 160 can aggregate across weeks and forecast the aggregate series, applying a multiplicative (average proportion of whole week) factor to desegregate back to the daily level. The NSF 130 and the SF 160 can further employ Association of Risk and Insurance Managers of America (ARIMA) methods that explicitly model time lags and cyclical dependencies. The above techniques may similarly be generalized to different time cycles, such as day-of-month cycles, days-to-end-of-month cycles, and week-of-month cycles.

The NSF 130 and the SF 160 may evaluate accuracy of the sales forecast through known methods to determine "Goodness of Fit" statistics. If the forecast does not have a good fit, the dynamic pricing system 100 can improve the results by changing the forecasting procedure, such as using non-linear regression to determine the forecast.

The results of the NSF 130 may be displayed to the user, as illustrated in FIG. 5. FIG. 5 is a spreadsheet 131 with a column 132 listing forecast demand for a product in a channel segment.

Cost Model

The pricing system 100 further includes a Cost Model (CM) 150, FIG. 2, that calculates costs assumptions used in determining the profit maximizing prices. The CM 150 may operate by accepting inputs from the users through input device 10. In this way, the function operates only to produce revenues and uses the user's cost estimates in considering profits.

In a preferred embodiment of the system 100, however, the CM 150 examines externally provided data to determine a base product cost that represents the actual costs to the seller for the product. For manufacturers, the base product cost represents the costs of acquiring raw materials and turning these materials into one unit of finished good, and for resellers, the base product cost represents actual amount paid to acquire one unit of the product.

The base product cost only includes the expenses intrinsically related to acquire a unit of the product and does not include all costs associated with the production and/or acquisition of the product. For example, advertising costs are not a base product cost because the sales of additional units of the product do not intrinsically increase this cost. Some other additional costs are overhead costs, inventory and handling costs, administrative costs, development costs, warranty costs, training costs, and freight costs. These types of additional costs may be handled as product cost adjustments by the dynamic pricing system 100, so that the costs may be considered when determining profit-maximizing prices. In a preferred embodiment, the dynamic pricing system 100 allows users to provide the incremental and/or percentage adjustments for each product. The total cost for the product, the base cost modified by all of the adjustments, is referred to as adjusted product cost.

In one embodiment, the CM 150 may account for differences in costs for transactions in different channel segments. The costs for sales in different channel segments may be due to different methods of distribution, differences in location or other common characteristics of sales in the channel segments. The CM 150 may dynamically determine these costs by evaluating the prior transaction data. Preferably, the dynamic pricing system 100 also allows the user to input incremental and percentage adjustment components for product sales in the channel segment to produce an adjusted product cost. In this way, the user has access to different types of cost metrics by initializing the adjustment factors with different values.

In addition to channel segment specific adjustments which consider the additional costs associated with the product at the channel segment level, it is possible that a seller needs special cost considerations for specific buyers, or buyer specific cost adjustments. For example, sales to a particular buyer may be more expensive because of greater transaction and delivery costs. The CM 150 may dynamically determine the additional costs for any particular buyer by evaluating the prior transaction data, using known statistical analysis techniques. The dynamic pricing system 100 also preferably allows the user to supply costs adjustment for product sales to particular buyers, to produce a buyer adjusted product cost.

In another embodiment, the CM 150 further accounts for any discounts given to a buyer for large volume sales. These discounts are generally modeled through a function that represents the increasing discount as the sales volumes increase. For example, the discount may be a step function that produces increasing discount amounts with increasing amounts of sales. The dynamic pricing system 100 treats a discount as a cost because the discount diminishes expected profit from a particular sale but does effect other transactions within the channel segment.

System 100 may also display costs and discount numbers to the user, is illustrated in the spreadsheet 131 of FIG. 5. The spreadsheet 131 includes an adjusted cost column 151 and a discount column 152 for each product in each channel segment.

Supply Forecast

In one embodiment, the system 100 further considers inventory levels. In particular, a basic premise of the dynamic system 100 is that future sales cannot exceed future inventory levels. Accordingly, the dynamic pricing system 100 caps sales forecasts at the forecasted inventory levels. In the dynamic pricing system 100, a Supply Forecaster (SUF) 190 forms an estimate of the future inventory in each channel segment. The SUF 190 may form an inventory forecast using any known accounting techniques and typically looks to current inventory levels and expected future changes to the inventory levels, such as sales and restocking. Where the seller may purchase unlimited additional inventory, the system can operate without the SUF 190 since any level of sales may be accomplished. The SUF 190 may also be replaced with a corresponding third party system to provide the same supply inputs.

If forecast horizon ends before a restocking date, then all of current inventory may not be available for use to satisfy the demand through the forecasting horizon. In this case, the SUF 190 determines how much of the current inventory is available to satisfy a future demand through the forecast horizon. One simple approach uses a linear approximation in which an amount of new inventory is added constantly, rather than using a step function having large, sudden changes in the inventory levels. For example, available inventory may be approximated as the current inventory multiplied by the ratio of the forecast horizon divided by the time until the next restocking.

Price Optimizer

Referring to FIG. 2, the dynamic pricing system 100 includes a Price Optimizer (OPT) 200 that produces a set of optimal prices that maximize total profit under given constraints across all channel segments, where the constraints are defined either by the general settings of the pricing problem or by specific rules selected by the user. The OPT 200 creates the profit maximizing prices using various data, including the product cost data from the CM 150 and the sales forecasts from the SF 160.

The OPT 200 generally assumes that a product sells at a single price for a particular channel segment. Difference in prices may be modeled in the form of volume discounts, as described in the above discussion of cost calculations. The OPT 200 then estimates profits from different sales for a product within the channel segment at different prices. In particular, the OPT 200 looks to $$\pi_{P,CS} = X_{P,CS} * (P_{CS} - C_{CS}) \quad \text{(Eq. 3)},$$

where $P_{CS}$ is the price for the product in the channel segment, $C_{CS}$ is the costs per product in the channel segment, $X_{P,CS}$ is the forecasted sales of the product in the channel segment at price P, and $\pi_{P,CS}$ is the expected profit from the product's sales in the channel segment at price P. As described above, SF 160 forecasts $X_{P,CS}$ by using the forecasted future sales at current price levels, as determined by NSF 130, and then adjusting the number of forecasted sales by the price elasticity of buyers in the channel segment, as determined by PSM 140:

$$X_{P,CS} = X_{P_{ref},CS} \cdot F_{PS}(P) \quad \text{(Eq. 4)}$$

where $X_{P_{ref},CS}$ is the normalized sales forecast at current price from the NSF 140 and $F_{PS}(P)$ is the price sensitivity adjustment to sales at price P. Likewise, CM 150 determines the costs per product within the channel segment. The OPT 200 generally starts at a base price, $P_{base}$, and gradually increases the price by a set increment, The OPT 200 then suggests the particular price(s) for the product that maximize profits within the channel segment. The OPT 200 may present the price recommendation in any form of output, such as printed page, but generally presents the prices through a graphic user interface (GUI) on a display monitor.

In one embodiment, the OPT 200 looks only to changes in profits caused by increases in prices. In this implementation, the OPT 200 can recommend a price increase that maximizes profits, generally a price that does not substantially decrease sales volumes while increasing revenues per product.

In another embodiment, the OPT 200 makes a more global analysis by performing estimates of a seller's profit levels within multiple relevant channel segments and provides prices for the multiple channel segments. This way, a seller may sacrifice profits within one channel segment to increase profits in a second channel segment. For example, the seller having a limited total inventory to be distributed in all channel segments may be better off selling less items in a first market to increase profits in a second market.

In the above-described analysis to determine optimal prices for a product, the OPT 200 uses several basic assumption, such as the pricing and sales of one product do not effect the pricing and sales of a second product. As a result, the amount of the forecasted sales equals the normalized forecasted sales times the price sensitivity adjustments. Furthermore, the OPT 200 may optionally assume that there are a minimum and a maximum allowable price within a channel segment. Given these assumptions, the OPT 200 can always produce one or more profit maximizing prices.

The OPT 200 may also assume a minimum and a maximum number of sales within the channel. The OPT 200 may optionally further assume that there is a maximum difference in prices for a product in two channel segments, where this maximum difference is an absolute amount (such as prices cannot differ by more than $10) or a relative ratio in prices (such as prices cannot differ by more than 10%). As the OPT 200 makes additional assumptions, it becomes increasing likely that a set of profit maximizing prices does not exist because a solution is not possible within the assumption. The OPT 200 then starts ignoring assumptions until a solution becomes possible.

The assumptions are stored in the strategic objectives (or business rules) database, 210. The users may adjust these assumptions according the realities of the products and markets. For example, where pricing or sales of a first product effect pricing or sales of a second product, the OPT 200 cannot assume that demand (or sales) for one product is independent of demand (or sales) for other products and that cross-product price elasticity does not exist. The OPT 200 must therefore use a sales forecast from the SF 160 that accounts for this dependency, and then product pricing that maximizes sales from both products. The sales for two products may be positively correlated, so that the sale of one product increases sales of the second product. Alternatively, sales of the two products may be negatively correlated, where sales of the first product decrease sales of the second product, such as products that are substitutable. In this case, a decrease in the price of the first product increases demand for this product while decreasing demand and sales for the second product. The dynamic pricing system 100 can account for these market conditions through altering the operation of the SF 160 so that forecasts of the demand of a certain product, in addition to using the historical demand data for that product, also examine the historical demand data for related products. The OPT 200 may consider cross-product elasticity in determining the optimal prices. Typically, total forecasted profits for the first product then becomes the originally expected profits plus any adjusts to profits caused by sales of the second product to reflect the codependence of the two products:

$$\frac{\delta(\text{Total Profit})}{\delta(\text{price of product 1})} = \quad \text{(Eq. 5)}$$

$$\frac{\delta(\text{sales of product 1})}{\delta(\text{price of product 1})} * \text{Unit Profit (Product 1)} +$$

$$(\text{Sale of Product 1}) * \frac{\delta(\text{sales of product 1})}{\delta(\text{price of product 1})} +$$

$$\frac{\delta(\text{sales of product 2})}{\delta(\text{price of product 1})} * \text{Unit Profit (Product 2)}.$$

In the above-described operation, the OPT 200 further assumes that unsold inventory does not incur any actual or opportunity cost. To improve the price prediction, the sellers may provide an estimate of storage costs for unsold inventory that is included in the calculations of the PM 150. For example, the OPT 200 may employ cost accounting that treats any unsold inventory as a cost against future profits.

The user must specify how to value inventory at the end of the forecasting horizon and/or restocking date. Issues that arise include valuing excess inventory at the end of the decision period, as well as any opportunity costs associated with carrying the items over a sales period and how to capture any increase in product that occurs during storage (appreciation) until the next period. Similarly, the OPT 200 should consider cost of lost sales due to insufficient inventory.

The OPT 200 also does not account for uncertainty in supply and demand. Instead, the OPT 200 treats these factors as deterministic once supply and demand are forecasted. The SUF 190 and the SF 160 could easily be modified to incorporate an uncertainty factor. Alternatively, the demand and supply could be modeled as stochastic processes having a known mean and variance, such as lognormal functions. The OPT 200's objective function of the optimization is then replaced by an function to maximize expected total profits.

The OPT 200 also operates under the assumption that competitor data is not available. Competitor data relates to information on the prices and sales of competing products in the same channel segments. Where this information is available, the dynamic pricing system 100 could improve sales forecast, since the price and supply of competing products obviously affects sales. For example, the existence of a closely related product at a lower price substantially limits the ability of the seller to increase prices. The PSM 140 and the SF 160 may use known techniques to incorporate and use the competitor data.

In another embodiment, the dynamic pricing system 100 uses available information on competitors in the OPT 200's determination of optimal, profit maximizing prices. For example, a Competitor Response Model (CRM) 170 uses historical data on competitor pricing and supply information to modify the price sensitivity findings of the PSM 140 and sales forecasts of the SF 160. These adjustments are based on the logical assumption that the price and availability of substitute products within a market influence the price sensitivity of consumers and similarly affect future sales. The OPT 200 could use known techniques to determine the demand elasticity of a certain product with respect to the competitor price and incorporate that in the objective function. Alternatively, the control variable within the system to determine price sensitivity (currently the price of the product) can be replaced by the ratio of the seller's price of the product to the competitor's price or the difference of the two values.

Therefore, the dynamic pricing system 100 may produce optimized price recommendations by exploiting a broad range of available pricing and sales data. If this broad range of market information is available, the dynamic pricing system 100 can model the size of the potential market as well as the market's sensitivity to price. The dynamic pricing system 100 forms a sales forecast, as a function of price and time, by modeling the market size from the market's price sensitivity. The dynamic pricing system 100 can then evaluate this sales forecast with respect to the available supply data and the seller's strategic objectives to generate the optimized price recommendation. Unfortunately, a broad range of market data is rarely available.

However, in most cases, the dynamic pricing system 100 must analyze the market using less-than-perfect pricing information. For example, if loss data is unavailable or not meaningful, market size is difficult to capture. A more direct way to achieve a price recommendation is to forecast sales directly as a function of price and time. In this way, the system bypasses the need to model market size and response but possibly produces less accurate forecasts.

Similarly, the dynamic pricing system may make optimized price recommendations even where data on some drivers of market response is unavailable because some important market drivers can be captured reliably in data. For instance, the overall supply in the market is an observation that may be more qualitative than quantitative. As a result, corresponding adjustments to the price or market response need to be made on a simpler basis with input from the user as the size of the adjustment to the final price or the shift to market response. These adjustments can be achieved through overrides to the sales forecasts, demand forecasts, or market response, or more directly, by a simple percentage adjustment to the price recommendation derived from the available data. The user may choose which adjustments to make.

The price recommendations from the price optimizer 200 may be further modified by a post-processor 240 to allow the system 100 to address various issues not explicitly addressed in the other components. A miscellaneous parameters database 250 stores parameters which are used to adjust prices to reflect behavior not represented in the above models. This may include items such as vendor and channel management rules, as well as industry/market availability.

System 100 may store the price recommendations in a price recommendation database 260 so that the system 100 can later access the price recommendations. The price recommendation database 260 may also store the assumptions/forecasts used to form the price recommendations.

Alert Generator

In another embodiment, the dynamic pricing system 100 further includes an alert generator 220, FIG. 2, that operates after a new set of product prices has been generated or a new day's worth of transactions has been loaded. The alert generator 220 notifies the user of any significant changes in prices or other product characteristics, including the number of actual units sold or actual margin that may indicate when actual sales behavior differs significantly from earlier forecasted behavior.

The user can choose, through the input device 10, conditions that cause the alert generator 220 to give notices, and these selected alert conditions are stored in an alert database 230. For example, the alert generator 220 may inform the user when statistics in the actual sales different from the expected, forecast values. For any particular product in a channel segment, the alert generator 220 may look at inventory statistics, the number of sales, the actual price of the products in the sales, the actual costs, revenues or the actual profits. The alert generator 220 notifies the user when the actual numbers differ from the forecasted values determined by other components of the dynamic pricing system 100.

In order to make these comparisons, the alert generator 220 stores the results from the OPT 200. The alert generator 220 further receives and analyzes data from the actual transactions, to compare the transactions with the forecasts.

The alert generator generally operates by comparing new entries in the transaction database 120 with forecasts contained in the price recommendation database 260.

Optimally, the user can also specify the time period from which the alert generator 220 compares expected results to actual results. For instance, the user may select the previous day, previous week, previous month, or previous year. Likewise, the thresholds chosen for alerts may be chosen to vary by the time span selection since a small deviation from expected profits may be important in the short term but may not matter over an extended period.

Integration of Dynamic Price System

Figure 6:
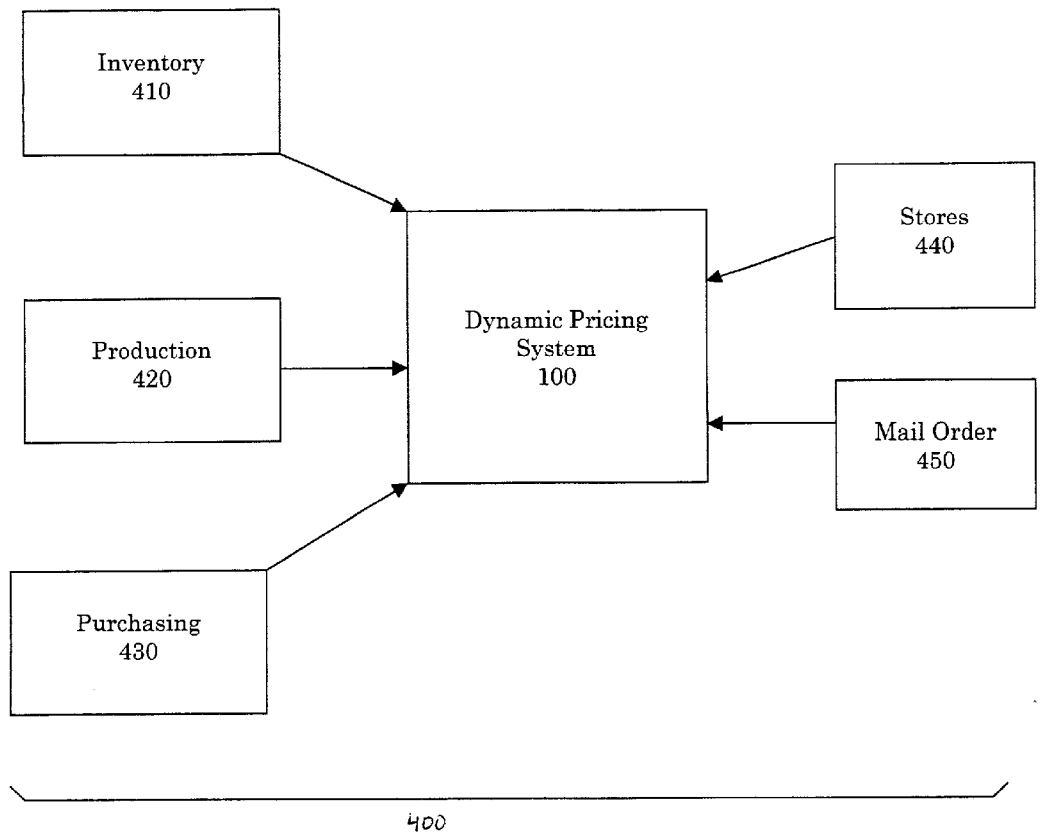

As illustrated in FIG. 6, the dynamic pricing system 100 may coexist within a larger framework 400. In particular, the system 100 may interact with various elements in the user's supply chain, including, a warehouse 410, a production center 420, and a purchasing center 430 to insure that supply matches appropriately with the demand forecasted by the dynamic pricing system 100. The dynamic pricing system 100 further sets prices in view of inventory levels. Similarly, the dynamic pricing system 100 connects to sales sites for the user, such as a store 440 and a mail order center 450. In this way, the dynamic pricing system 100 sets sales prices and monitors actual sales at the sales sites 440 and 450. Much like a feed back loop, the dynamic pricing system 100 uses the sales data to adjust prices to the sales chain and inventory requests to the supply chain.

Based on this model, a dynamic pricing process 500 is illustrated in FIG. 7. Specifically, the dynamic pricing system collects past sales data, step 510 and uses this data to forecast future sales at different prices, step 520. Using results from the step 520, the dynamic pricing system selects prices that optimize profits, step 530. The profit maximization may be adjusted accordingly by choosing conditions, step 540. In step 550, the seller then sells in each channel segment at the recommended prices from the step 530. New sales information reflecting the price recommendations from the step 530 are collected, step 560, and added to the other past sales data (step 510), and the process repeats from the start.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereinafter.

What is claimed is:

1. A system for dynamically pricing a product, the system comprising:

means for collecting and storing data on past and current sales;

means for forecasting normalized future sales volume based upon the past sales data;

means for forecasting normalized future sales volume based upon the past sales data;

means for determining price sensitivity of consumers to changes in price of the product based upon past data, wherein the means for determining price sensitivity uses a logistic mathematical model that comprises a price sensitivity function:

$$F_{PS}(P)=0.2*\{1-[\text{Arc-Tan}(\alpha*(P_{final}-P_{REF}))*2/\text{Pi}]\},$$

wherein $P_{ref}$ is a reference price $P_{ref}$, $P_{final}$ is final price, and $\alpha$ is empirically determined according to the past and current sales data;

means for forecasting future sales volume at different prices by adjusting the normalized future sales volume forecast by the price sensitivity;

means for accepting user input to define for one or more strategic objectives, means for determining an optimal price according to the strategic objectives using the future sales volume forecast and costs for the product; and means for evaluating the current sales at the optimal price and for using the evaluation to modify the optimal price according to the strategic objectives.

2. The system of claim 1 further comprising means for classifying the past sales into one or more channel segments, whereby each of the past sales is classified into only one channel segment.

3. The system of claim 2, wherein the costs for the product include a different channel segment cost in each of the channel segments.

4. The system of claim 1, wherein one of said strategic objectives is a minimum price for the product.

5. The system of claim 1, wherein one of said strategic objectives is a maximum price for the product.

6. The system of claim 1, wherein one of said strategic objectives is a minimum sales volume for the product.

7. The system of claim 1, wherein one of said strategic objectives is a maximum sales volume for the product.

8. The system of claim 1 further comprising a means for forecasting a response of a competitor to a change in the price of the product by the seller, whereby the means for forecasting future sales volume at different prices accounts for the competitor's response.

9. The system of claim 1 further comprising a means for determining lost sales data, whereby the means for forecasting future sales volume at different prices accounts for the competitor's response.

10. The system of claim 1 further comprising a means for alerting the seller of an occurrence of a pre-specified event.

11. The system of claim 10, wherein the means for alerting the seller compares prices for actual sales to the optimal price, and the pre-specified event is a difference between the actual sales and the optimal price.

12. The system of claim 10, wherein the means for alerting the seller compares actual sales at the optimal price to the forecasted sales volumes at the optimal price.

13. The system of claim 12, wherein the pre-specified event occurs when a ratio of actual sales volume to the forecasted sales volume is less than a first pre-specified amount.

14. The system of claim 12, wherein the pre-specified event occurs when the forecasted sales volume exceeds the actual sales volume by more than a second pre-specified amount.

15. A method of dynamically pricing a product, the method comprising the steps of:

accepting and storing one or more strategic objectives from a seller;

collecting data on past sales;

forecasting normalized future sales volume based upon the past sales data;

determining price sensitivity of consumers to changes in price of the product based upon the past sales data, wherein the step of determining price sensitivity uses a logistic mathematical model that comprises a price sensitivity function:

$$F_{PS}(P)=0.2*\{1-[\text{ArcTan}(\alpha*(P_{final}-P_{REF}))*2/\pi]\},$$

wherein $P_{REF}$ is a reference price, $P_{final}$ is final price, and

α is empirically determined according to the past and the current sales data; n forecasting future sales volume at different prices by adjusting the normalized future sales volume forecast by the price sensitivity;

determining an optimal price according to the strategic objectives using the future sales volume forecast and costs for the product;

selling the product at the optimal price;

collecting current sales data on sales of the product at the optimal price in real time;

repeating in real time said steps of forecasting normalized future sales volume, determining price sensitivity of consumers, and forecasting future sales volume at different prices using said past and current sales data; and updating the optimal price according to the strategic objectives using the future sales volume forecast for past and current sales and costs for the product.

16. The method of claim 15 further comprising the step of dynamically determining the costs for the product.

17. The method of claim 15 further comprising the step of classifying the past sales into different channel segments, wherein each of the past sales is classified into only one of the channel segments and wherein the step of forecasting future sales at different prices further comprises forecasting future sales in each of the channel segments.

18. The method of claim 17, wherein the costs for the product include a different channel segment cost for each of the channel segments.

19. The method of claim 17, wherein the step of determining an optimal price is performed for each of the channel segments.

20. The method of claim 15, wherein one of said strategic objectives is a minimum price for the product.

21. The method of claim 15, wherein one of said strategic objectives is a maximum price for the product.

22. The method of claim 15, wherein one of said strategic objectives is a minimum sales volume for the product.

23. The method of claim 15, wherein one of said strategic objectives is a maximum sales volume for the product.

24. The method of claim 15, wherein the step of forecasting future sales volume further accounts for inventory of the product.

25. The method of claim 24, wherein the inventory accounts for the forecasted sales for the product at the optimal price.

26. The method of claim 15, wherein the step of forecasting future sales volume further accounts for an expected response of a competitor.

27. The method of claim 15, wherein the step of forecasting future sales volume further accounts for lost sales data.

28. The method of claim 15, further comprising the step of comparing actual sales at the optimal price to forecasted sales volumes at the optimal price.

29. The method of claim 28 further comprising the step of adjusting the optimal price to account for actual sales.

30. The method of claim 28 further comprising the step of alerting the seller when the ratio of actual sales volume to forecasted sales volume at the optimal price is less than a first pre-specified amount.

31. The method of claim 28 further comprising the step of alerting the seller when the actual sales volume is less than the forecasted sales volume by more than a second pre-specified amount.

32. The method of claim 15, wherein the step of determining an optimal price further comprising accounting for a volume discount for the product.

33. The method of claim 15, wherein the step of determining price sensitivity further comprises accounting for a relationship between sales of the product and a second product.

34. A program storage device readable by a machine, tangibly embodying a program of instructions executable by a machine to perform method steps for dynamically determining a price a product, said method steps comprising:

accepting and storing one or more strategic objectives;

collecting data on past sales;

forecasting normalized future sales volume based upon the past sales data;

determining price sensitivity of consumers to changes in price of the product based upon the past sales data using a price sensitivity function, wherein the method step of determininc price sensitivity uses a price sensitivity function:

$$F_{PS}(P)=0.2*\{1-[\text{ArcTan}(\alpha*(P_{final}-P_{REF}))*2/\pi]\},$$

wherein $P_{REF}$ is a reference price, $P_{final}$ is final price, and

α is empirically determined according to the past and the current sales data;

forecasting future sales volume at different prices by adjusting the normalized future sales volume forecast by the price sensitivity;

determining an optimal price according to the strategic objectives using the future sales volume forecast and costs for the product;

collecting current sales data on the sales of the product at the optimal price;

repeating said steps of forecasting normalized future sales volume, determining price sensitivity of consumers, and forecasting future sales volume at different prices using said past and current sales data; and modifying said optimal price according to the strategic objectives using the future sales volume forecast for past and current sales and costs for the product.

* * * * *

UNITED STATES PATENT AND TRADEMARK OFFICE
CERTIFICATE OF CORRECTION

PATENT NO.        : 7,133,848 B2
APPLICATION NO. : 09/859674
DATED             : November 7, 2006
INVENTOR(S)       : Phillips et al.

It is certified that error appears in the above-identified patent and that said Letters Patent is hereby corrected as shown below:

Column 13, line 56, please delete "$F_{PS}(P)=0.2*\{1-[\text{Arc-Tan}(\alpha*(P_{final}-P_{REF}))*2/\text{Pi}]\}$,"

and replace with

-- $F_{PS}(P)=0.2*\{1-[\text{Arc-Tan}(\alpha*(P_{final}-P_{REF}))*2/\pi]\}$,--

Column 13, line 59, please delete "$P_{ref}$ is a reference price $P_{ref}$"

and replace with

-- $P_{REF}$ is a reference price --

Signed and Sealed this

Thirteenth Day of February, 2007

JON W. DUDAS
*Director of the United States Patent and Trademark Office*